(12) United States Patent
Lundberg et al.

(10) Patent No.: US 11,328,543 B2
(45) Date of Patent: *May 10, 2022

(54) KEY DELEGATION FOR CONTROLLING ACCESS

(71) Applicant: ASSA ABLOY AB, Stockholm (SE)

(72) Inventors: Frans Lundberg, Saltsjöbaden (SE); Peter Stenlund, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 98 days.

This patent is subject to a terminal disclaimer.

(21) Appl. No.: 16/329,662

(22) PCT Filed: Aug. 30, 2017

(86) PCT No.: PCT/EP2017/071785
§ 371 (c)(1),
(2) Date: Mar. 1, 2019

(87) PCT Pub. No.: WO2018/041904
PCT Pub. Date: Mar. 8, 2018

(65) Prior Publication Data
US 2019/0199728 A1 Jun. 27, 2019

(30) Foreign Application Priority Data

Sep. 2, 2016 (SE) .................... 1651182-6

(51) Int. Cl.
*G07C 9/00* (2020.01)
*H04L 29/06* (2006.01)
(Continued)

(52) U.S. Cl.
CPC ..... *G07C 9/00174* (2013.01); *G07C 9/00571* (2013.01); *G07C 9/00857* (2013.01);
(Continued)

(58) Field of Classification Search
None
See application file for complete search history.

(56) References Cited

U.S. PATENT DOCUMENTS

| 7,343,014 | B2 | 3/2008 | Sovio et al. |
| 8,769,642 | B1 * | 7/2014 | O'Neill ................ H04L 63/102 726/5 |

(Continued)

FOREIGN PATENT DOCUMENTS

| CN | 105046796 | 11/2015 |
| CN | 105915344 | 8/2016 |

(Continued)

OTHER PUBLICATIONS

International Search Report prepared by the European Patent Office dated Oct. 20, 2017, for International Application No. PCT/EP2017/071785.

(Continued)

*Primary Examiner* — Arezoo Sherkat
(74) *Attorney, Agent, or Firm* — Sheridan Ross P.C.

(57) ABSTRACT

It is provided a method for controlling access to an access object. The method is performed in an electronic key device and comprises the steps of: communicating with an access control device to obtain an identity of the access control device; sending an access request to a server, the access request comprising an identity of the electronic key device and the identity of the access control device; receiving a response from the server, the response comprising a key delegation to the electronic key device; and sending a grant access request to the access control device, the grant access request comprising the key delegation, to allow the access control device to evaluate whether to grant access to the access object based on a plurality of delegations comprising a sequence of delegations.

13 Claims, 3 Drawing Sheets

(51) Int. Cl.
*H04L 9/32* (2006.01)
*H04W 12/084* (2021.01)

(52) U.S. Cl.
CPC .............. *H04L 9/32* (2013.01); *H04L 63/061* (2013.01); *H04L 63/0884* (2013.01); *H04L 63/10* (2013.01); *H04L 63/101* (2013.01); *H04L 63/108* (2013.01); *H04W 12/084* (2021.01); *G07C 2009/00769* (2013.01); *G07C 2009/00825* (2013.01); *G07C 2009/00865* (2013.01)

(56) References Cited

U.S. PATENT DOCUMENTS

| | | | |
|---|---|---|---|
| 9,542,785 | B2 | 1/2017 | Meganck et al. |
| 2002/0161999 | A1* | 10/2002 | Gunter .................. G06F 21/33 713/168 |
| 2002/0162001 | A1* | 10/2002 | Gunter .................. G06F 21/33 713/176 |
| 2002/0162018 | A1* | 10/2002 | Gunter .................. G06F 21/33 726/4 |
| 2002/0162019 | A1* | 10/2002 | Berry .................... G06F 21/33 726/5 |
| 2006/0072755 | A1 | 4/2006 | Oskari |
| 2010/0077474 | A1 | 3/2010 | Yacoub et al. |
| 2012/0102548 | A1* | 4/2012 | Tamura .................. G06F 21/31 726/4 |
| 2013/0095802 | A1 | 4/2013 | Wang |
| 2014/0049362 | A1 | 2/2014 | Ahearn et al. |
| 2015/0222517 | A1* | 8/2015 | McLaughlin ....... G06F 11/3051 713/156 |
| 2016/0036788 | A1 | 2/2016 | Conrad et al. |
| 2016/0042207 | A1 | 2/2016 | Inotay et al. |
| 2017/0011570 | A1 | 1/2017 | Johnson et al. |
| 2017/0109759 | A1 | 4/2017 | Korb |
| 2017/0171201 | A1* | 6/2017 | Matsugashita ........ H04L 63/062 |
| 2017/0223005 | A1* | 8/2017 | Birgisson ............ H04L 63/0807 |
| 2017/0337755 | A1* | 11/2017 | Biehl ..................... G07C 9/28 |

FOREIGN PATENT DOCUMENTS

| | | |
|---|---|---|
| EP | 2493232 | 8/2012 |
| WO | WO 01/63385 | 8/2001 |
| WO | WO 03/088166 | 10/2003 |
| WO | WO 2014/098755 | 6/2014 |

OTHER PUBLICATIONS

Written Opinion prepared by the European Patent Office dated Oct. 20, 2017, for International Application No. PCT/EP2017/071785.
International Preliminary Report on Patentability—Chapter II of the Patent Cooperation Treaty prepared by the European Patent Office dated Dec. 13, 2018, for International Application No. PCT/EP2017/071785.
Official Action for Sweden Patent Application No. 1651182-6, dated Apr. 6, 2017, 9 pages.
Borisov et al. "Active Certificates: A Framework for Delegation," Network and Distributed System Security Symposium 2002, Feb. 2002, 11 pages.
Taly et al. "Distributed Authorization in Vanadium," arxiv.org, Cornell University Library, 201 Olin Library Cornell University Ithaca, NY, Jul. 2016, 24 pages.
International Search Report and Written Opinion for International (PCT) Patent Application No. PCT/EP2018/054521, dated May 25, 2018, 12 pages.
International Preliminary Report on Patentability for International (PCT) Patent Application No. PCT/EP2018/054521, dated May 14, 2019, 13 pages.
Official Action for Sweden Patent Application No. 1750200-6, dated Nov. 6, 2017, 7 pages.
Official Action for U.S. Appl. No. 16/487,163, dated Aug. 7, 2020 11 pages.
Official Action for U.S. Appl. No. 16/487,163, dated Jan. 25, 2021 9 pages.
Official Action for India Patent Application No. 201917007421, dated Aug. 1, 2021, 6 pages.
Official Action with English Translation for China Patent Application No. 201780053448.1, dated Apr. 20, 2021, 19 pages.
Notice of Allowance for U.S. Appl. No. 16/487,163, dated Oct. 21, 2021 5 pages.
Official Action with English Translation for China Patent Application No. 201780053448.1, dated Jan. 29, 2022, 14 pages.

* cited by examiner

KEY DELEGATION FOR CONTROLLING ACCESS

CROSS REFERENCE TO RELATED APPLICATIONS

This application is a national stage application under 35 U.S.C. 371 and claims the benefit of PCT Application No. PCT/EP2017/071785 having an international filing date of 30 Aug. 2017, which designated the United States, which PCT application claimed the benefit of Sweden Patent Application No. 1651182-6 filed 2 Sep. 2016, the disclosure of each of which are incorporated herein by reference.

TECHNICAL FIELD

The invention relates to a method, an electronic key device, a computer program and a computer program product relating to controlling access to an access object using a key delegation.

BACKGROUND

There are many types of objects for which it is desirable to control access, herein denoted access objects. For instance, an access object can be a lock for access to a physical space. Alternatively, the access object can be a charge point for an electric vehicle. Alternatively, the access object can be an office device (e.g. photocopier, printer, coffee machine, electrical socket, network connection etc.).

Access to such access objects can be controlled by requiring the use of an appropriate electronic key device. The electronic key device can communicate with an access control device over a wireless or wired interface. Such electronic interfaces improve usability while electronic key management is significantly more flexible regarding management of access rights compared to mechanical access control, especially when a local access control device communicates with an access control server to verify access rights for a particular electronic key device. In that way, access for a particular electronic key device can be managed centrally by managing the access rights stored in the access control server.

However, there are a number of problems with this approach of central access right management. In particular, the access control device does not have full control over access, since the access is managed centrally. Moreover, such a system is vulnerable if an attacker gains access to the central server, at which point the attacker can modify the system such that any key device can gain access to all connected access objects.

There are also offline systems available, where access rights are stored in the access control device or in the key. However, the offline systems are either very simple and non-flexible, or managed by intermittent access to a server, which gives the same vulnerability problems as for an online system, albeit to a less degree.

SUMMARY

It is an object of embodiments presented herein to provide an improved way to control access to an access object.

According to a first aspect, it is provided a method for controlling access to an access object. The method is performed in an electronic key device and comprises the steps of: communicating with an access control device to obtain an identity of the access control device; sending an access request to a server, the access request comprising an identity of the electronic key device and the identity of the access control device; receiving a response from the server, the response comprising a key delegation to the electronic key device; and sending a grant access request to the access control device, the grant access request comprising the key delegation, to allow the access control device to evaluate whether to grant access to the access object based on a plurality of delegations comprising a sequence of delegations covering a delegation path from the access control device to the electronic key device such that, in the sequence of delegations, the delegator of the first delegation is the access control device, and the last delegation is the key delegation, wherein each delegation is a delegation of an access right for the access object from a delegator to a receiver, and each delegation comprises a delegator identifier and a receiver identifier.

Each delegation may be of the same data structure.

The key delegation may be digitally signed by the delegator of the delegation.

The key delegation may comprise a time constraint.

The key delegation may comprise an operation constraint.

In the step of receiving a response, the response may be based on the server verifying the existence of a user account associated with the identity of the electronic key device.

According to a second aspect, it is provided an electronic key device for controlling access to an access object. The electronic key device comprises: a processor; and a memory storing instructions that, when executed by the processor, causes the electronic key device to: communicate with an access control device to obtain an identity of the access control device; send an access request to a server, the access request comprising an identity of the electronic key device and the identity of the access control device; receive a response from the server, the response comprising a key delegation to the electronic key device; and send a grant access request to the access control device, the grant access request comprising the key delegation, to allow the access control device to evaluate whether to grant access to the access object based on a plurality of delegations comprising a sequence of delegations covering a delegation path from the access control device to the electronic key device such that, in the sequence of delegations, the delegator of the first delegation is the access control device, and the last delegation is the key delegation, wherein each delegation is a delegation of an access right for the access object from a delegator to a receiver, and each delegation comprises a delegator identifier and a receiver identifier.

Each delegation may be of the same data structure.

The key delegation may be digitally signed by the delegator of the delegation.

The key delegation may comprise a time constraint.

The key delegation may comprise an operation constraint.

In the step of receiving a response, the response may be based on the server verifying the existence of a user account associated with the identity of the electronic key device.

According to a third aspect, it is provided a computer program for controlling access to an access object. The computer program comprises computer program code which, when run on an electronic key device causes the electronic key device to: communicate with an access control device to obtain an identity of the access control device; send an access request to a server, the access request comprising an identity of the electronic key device and the identity of the access control device; receive a response from the server, the response comprising a key delegation to the electronic key device; and send a grant access request to the access control device, the grant access request comprising the key delegation, to allow the access control device to evaluate whether to grant access to the access object based on a plurality of delegations comprising a sequence of delegations covering a delegation path from the access control device to the electronic key device such that, in the sequence of delegations, the delegator of the first delegation is the access control device, and the last delegation is the key delegation, wherein each delegation is a delegation of an access right for the access object from a delegator to a receiver, and each delegation comprises a delegator identifier and a receiver identifier.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
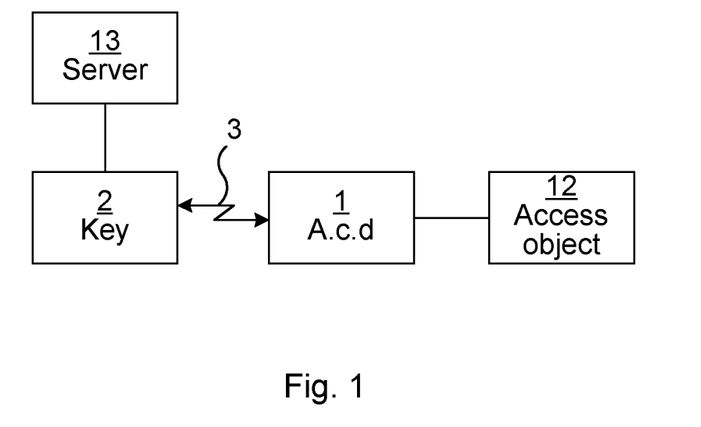
FIG. 1 is a schematic diagram showing an environment in which embodiments presented herein can be applied.

FIG. 1 is a schematic diagram showing an environment in which embodiments presented herein can be applied. Access to an access object 12 is controlled by an access control device 1. The access object can be any type of object to which access is to be selectively controlled. The access object 12 can be a lock for access to a physical space. Alternatively, the access object 12 can be a charge point for an electric vehicle. Alternatively, the access object 12 can be an office device (e.g. photocopier, printer, coffee machine, electrical socket, network connection etc.). Optionally, the access object 12 of and the access control device 1 are combined in a single device.

The access control device 1 is able to receive and send signals from/to an electronic key device 2 over a communication channel 3 which may be a short range wireless interface or a conductive (i.e. galvanic/electric) connection. The electronic key device 2 is any suitable device portable by a user and which can be used for authentication over the communication channel 3. The electronic key device 2 is typically carried or worn by a user and may be implemented as a smartphone, physical key, a key fob, wearable device, etc.

The short range wireless interface is a radio frequency wireless interface and could e.g. employ Bluetooth, Bluetooth Low Energy (BLE), ZigBee, Radio Frequency Identification (RFID), any of the IEEE 802.11 standards, any of the IEEE 802.15 standards, wireless Universal Serial Bus (USB), etc. The electronic key device can also be considered to be a credential. Using the communication channel 3, the identity of the electronic key device 2 can be obtained. Moreover, the authenticity of the identity electronic key device 2 can be checked, e.g. using a challenge and response scheme or by verifying a digital signature. In any case, an identity of the electronic key device 2 is obtained, which is used in the process to grant or deny access as explained in more detail below.

When access is granted, the access control device 1 sends a grant signal to the access object 12, whereby the access object 12 is set to a usable state. For instance, when the access object 12 is a lock, the lock is set to an open state when the grant signal is sent from the access control device 1 to the access object 12. When the access object 12 is a charge point for an electric vehicle, charging of the vehicle can begin only after the grant signal is sent from the access control device 1 to the access object 12. When the access object 12 is an office device, the access can be used as desired for photocopying, printing, making coffee, receiving power, gaining network access, etc.

The grant signal can be sent in any suitable way between the access control device 1 and the access object 12. For instance, the grant signal can be transmitted over a wire-based communication interface, e.g. using Universal Serial Bus (USB), Ethernet, a serial connection (e.g. RS-485 or RS-232) or even a simple electric connection, or alternatively signal over a wireless communication interface. Optionally, the access control device 1 is integrated with the access object 12, whereby the grant signal is transmitted internally, which may even occur as a software signal between different software modules of the combined access control device 1/access object 12.

Optionally, energy harvesting of mechanical user actions and/or environmental power (solar power, wind, etc.) can be utilised to prolong the life span of the battery or even to allow a battery to be omitted for the access control device 1 and/or the access object 12. Alternatively or additionally, mains power (optionally via a power converter) or a battery is used to power the access control device 1 and/or the access object 12.

Since the access control device 1 does not need any keypad, display or other large user interface component, the access control device 1 can be made very small to simplify integration with the access object 12.

A server 13 is provided and is accessible for the electronic key device 2. For instance, when the electronic key device 2 is implemented as a smartphone, the key device 2 can communicate using a cellular network and a wide area network (e.g. the Internet) to be in contact with the server 13. As explained in more detail below, the server 13, when appropriate transmits a key delegation to the electronic key device 2 which is subsequently used by the access control device 1 to determine whether the electronic key device is to be granted access to the access object 12. The server 13 can be any suitable server type computer which can communicate with the electronic key device as described herein.

Figure 2:
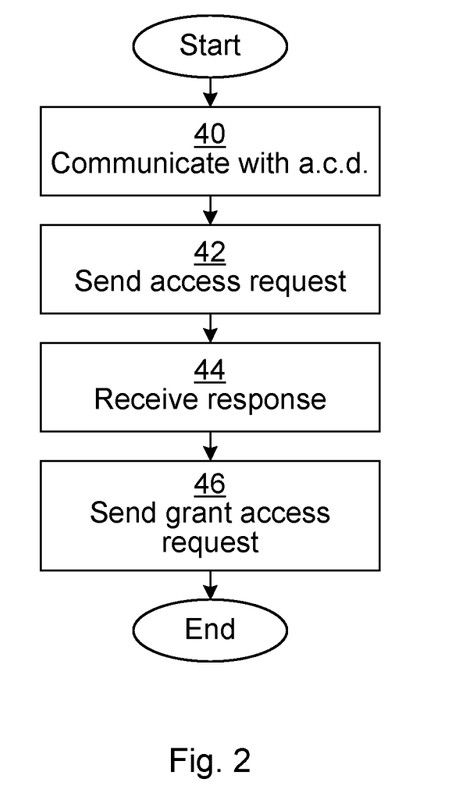
FIG. 2 is a flow chart illustrating methods for controlling access to an access object, performed in the access control device of FIG. 1.

FIG. 2 is a flow chart illustrating methods for controlling access to an access object, performed in the access control device of FIG. 1. Essentially, the method corresponds to the actions of the electronic key device 2 of FIG. 3 and explained below.

In a communicate with a.c.d. (Access Control Device) step 40, the electronic key device communicates with an access control device to obtain an identity of the access control device.

In a send access request step an access request is sent to a server. The access request comprising an identity of the electronic key device and the identity of the access control device.

In a receive response step 44, a response is received from the server, the response comprising a key delegation to the electronic key device.

The key delegation can be digitally signed by the delegator of the delegation. The digital signature then forms part of the delegation to make the delegation a signed delegation. When the key delegation is digitally signed, non-repudiation is achieved, i.e. it cannot reasonably be argued that the operator of the server has not signed the key delegation.

The key delegation can comprise a time constraint. For instance, the key delegation can be valid for a certain number of minutes, or only on weekdays between 7 a.m. and 8 p.m.

The key delegation can comprise an operation constraint. Operations can e.g. be lock, unlock, charge (e.g. from a vehicle charge point), gain network access, reconfigure the access control device, etc.

As explained in more detail below with reference to FIG. 3, the response can be based on the server verifying the existence of a user account associated with the identity of the electronic key device.

In a send grant access request step 46, a grant access request is sent to the access control device. The grant access request comprises the key delegation (along with any time constraint and/or operation constraint, when present). The access control device also obtains delegations from the access control device to the server 13. In this way, the access control device can evaluate whether to grant access to the access object based on a plurality of delegations comprising a sequence of delegations covering a delegation path from the access control device to the electronic key device such that, in the sequence of delegations, the delegator of the first delegation is the access control device, and the last delegation is the key delegation. Each delegation is a delegation from a delegator to a receiver. Whenever the term 'delegation' is used herein, it is a data item which delegates an access right to the access object 12 from a delegator to a receiver. The delegation contains both the delegator identifier and the receiver identifier. In this way, a device who wants to verify a delegation sequence can verify this simply by examining the delegations making up the sequence. The access right can be implicit, i.e. not identified in the delegation, or the access right can be explicit, i.e. identified in the delegation. Optionally, each delegation is of the same data structure, further simplifying the process of verifying sequence of delegations.

Optionally, the access control device obtains at least one delegation from a (local and persistent) storage of the access control device. For instance, the first delegation, being a delegation from the access control device, can be obtained from storage of the access control device. Each delegation obtained from the electronic key device can be mandated to be digitally signed by the delegator of the respective delegation, i.e. delegations from the electronic key device which are not validly signed are discarded. It is to be noted that the first delegation can be implemented by assigning one or more owners in the configuration of the access control device. In other words, optionally, the first delegation can be implemented differently from the subsequent delegations in the sequence.

When present, the access control device can enforce any time constraint of the key delegation. Also, when present, the access control device can enforce any operation constraint of the key delegation.

By using the delegation sequence as described here, great flexibility and control is provided without the access control device being able to communicate with the server 13. Delegations can be made in any suitable way directly or indirectly, supporting new business cases not possible using prior art systems. By supporting many use cases and scenarios, a single type of access control device and access object can be used, i.e. there no need for multiple versions of the access control device or access object for different uses, greatly reducing costs in development, production and distribution.

Moreover, a full access configuration user of the access control is always in full control over access. Such a user can revoke access for any server (directly or via intermediate nodes), after which any key delegations from such a server will not be sufficient to grant access, since the delegation path from the access control device to the electronic key device has been broken.

Since the electronic key device communicates with the server in order to gain access, any delegation in the delegation path which is revoked, immediately blocks access for any electronic key devices relying on the revoked delegation in its delegation path.

Figure 3:
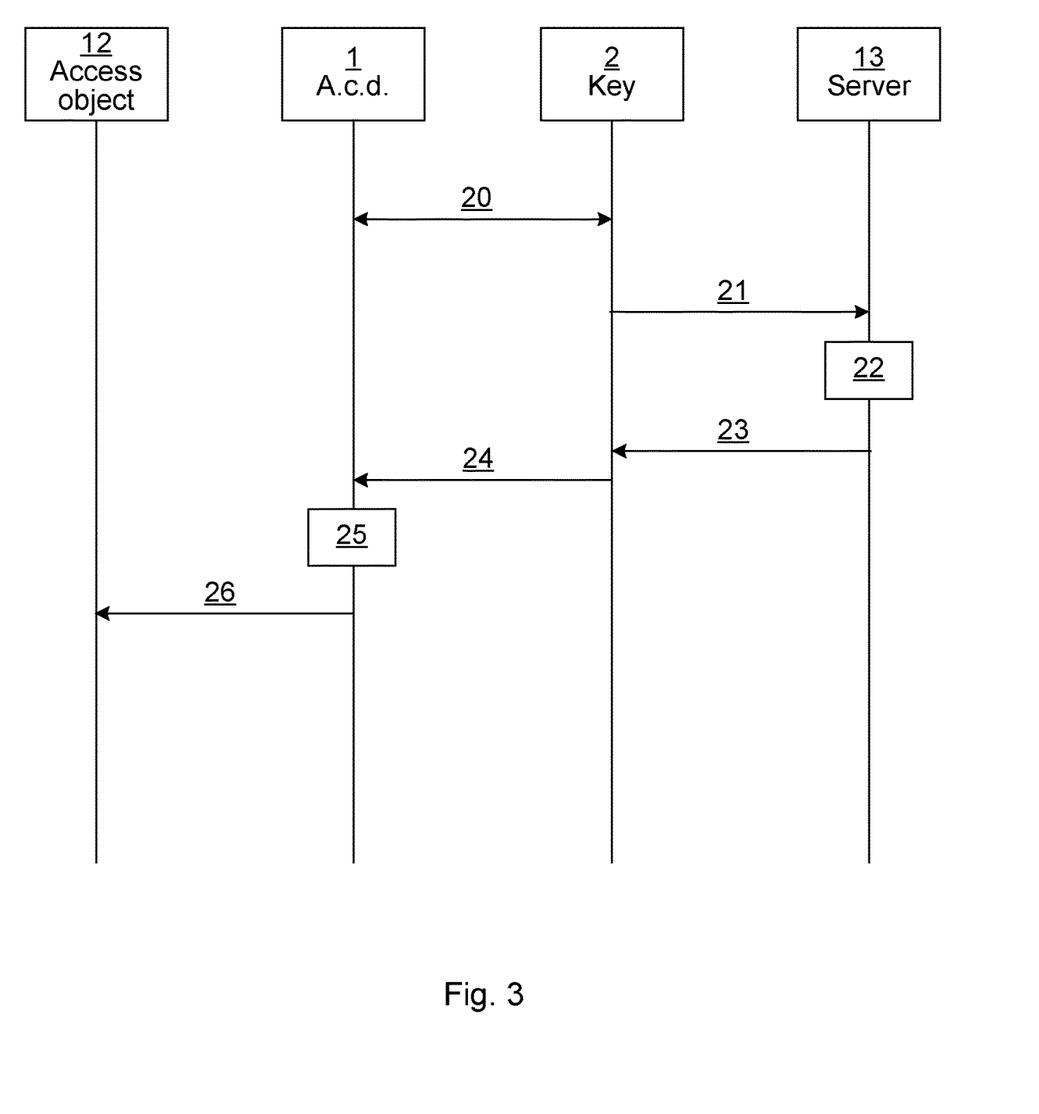
FIG. 3 is a sequence diagram describing in some more detail how the access control is performed according to one embodiment.

FIG. 3 is a sequence diagram describing in some more detail how the access control is performed according to one embodiment.

Firstly, the electronic key device 2 communicates 20 with the access control device 1 in order to obtain the identity of the access control device 1.

The electronic key device 2 then sends an access request 21 to the server 13. The access request 21 comprises both an identity of the electronic key device 2 and the identity of the access control device 2.

The server 13 determines 22 whether the access control device 1 is to grant access to the electronic key device 2. For instance, the server 13 can check whether there is a user stored which is associated with the identity of the electronic key device 2, which has all required data, e.g. payment data, etc.

Once approved, the server 13 sends a response 23 to the electronic key device 2. The response 23 comprises a key delegation to the electronic key device 2. It is to be noted, as explained above, that there also needs to be a delegation path from the access control device 1 to the server 13 for the access control device 1 to grant access; it is not sufficient with only the key delegation.

The electronic key device 2 then sends a grant access request 24 to the access control device.

At this point, the access control device 1 is in a position to evaluate whether to grant access to the access object 12. This evaluation is based on a plurality of delegations comprising a sequence of delegations covering a delegation path from the access control device 1 to the electronic key device 2 such that, in the sequence of delegations, the delegator of the first delegation is the access control device, and the last delegation is the key delegation.

When access is granted, the access control device 1 sends a grant signal 26 to the access object to thereby effect the granted access.

Figure 4:
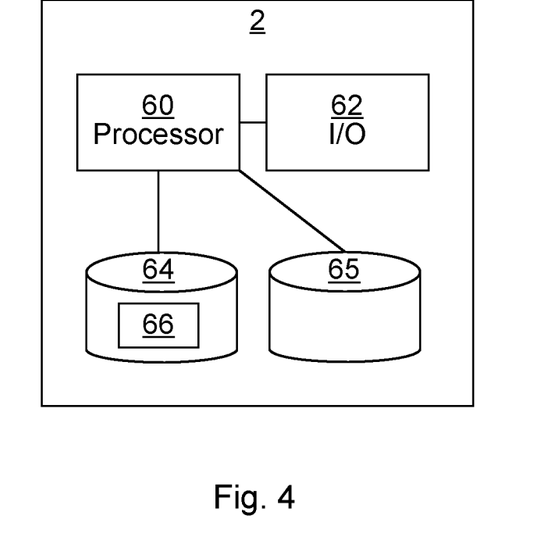
FIG. 4 is a schematic diagram illustrating some components of an electronic key device according to FIG. 1.

FIG. 4 is a schematic diagram showing some components of the electronic key device 2 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIG. 2 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 is also provided for reading and/or storing data during execution of software instructions in the processor 60. The data memory 65 can be any combination of read and write memory (RAM) and read only memory (ROM) which may be persistent and/or volatile memory. The data memory 65 can form part of the access control device 1 or be external, but local to, the access control device 1. The data memory 65 can store delegations as described above. The delegations can be stored in a persistent part of the data memory 65, e.g. in a flash memory.

The electronic key device 2 further comprises an I/O interface 67 for communicating with other external entities such as the server 13 and the access control device 1. The I/O interface comprises components for local communication and/or cellular network communication. The I/O interface 62 may support wire-based communication, e.g. using Universal Serial Bus (USB), Ethernet or a galvanic/electric connection for communicating with the access control device 1. Alternatively or additionally, the I/O interface 62 supports wireless communication, e.g. using any cellular network standard (e.g. W-CFMA (Wideband Code Division Multiple Access), LTE (Long Term Evolution), Bluetooth, BLE, ZigBee, RFID, any of the IEEE 802.11 standards, any of the IEEE 802.15 standards, wireless USB, etc., e.g. for communication with the access control device 1 and the server 13.

Other components of the electronic key device 2 are omitted in order not to obscure the concepts presented herein.

Figure 5:
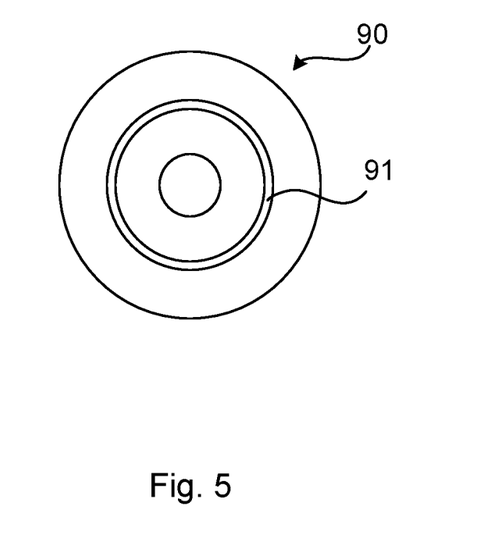
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for controlling access to an access object, the method being performed in an electronic key device and comprising the steps of:
communicating with an access control device to obtain an identity of the access control device;
sending an access request to a server, the access request comprising an identity of the electronic key device and the identity of the access control device;
receiving a response from the server, the response comprising a key delegation to the electronic key device; and
sending a grant access request to the access control device, the grant access request comprising the key delegation, to allow the access control device to evaluate whether to grant access to the access object based on a plurality of delegations comprising a sequence of delegations covering a delegation path from the access control device to the electronic key device such that, in the sequence of delegations, the delegator of the first delegation is the access control device, and the last delegation is the key delegation, wherein each delegation is a delegation from a delegator to a receiver.

ii. The method according to embodiment 1, wherein the key delegation is digitally signed by the delegator of the delegation.

iii. The method according to any one of the preceding embodiments, wherein the key delegation comprises a time constraint.

iv. The method according to any one of the preceding embodiments, wherein the key delegation comprises an operation constraint.

v. The method according to any one of the preceding embodiments, wherein in the step of receiving a response, the response is based on the server verifying the existence of a user account associated with the identity of the electronic key device.

vi. An electronic key device for controlling access to an access object, the electronic key device comprising:
a processor; and
a memory storing instructions that, when executed by the processor, causes the electronic key device to:
communicate with an access control device to obtain an identity of the access control device;
send an access request to a server, the access request comprising an identity of the electronic key device and the identity of the access control device;
receive a response from the server, the response comprising a key delegation to the electronic key device; and
send a grant access request to the access control device, the grant access request comprising the key delegation, to allow the access control device to evaluate whether to grant access to the access object based on a plurality of delegations comprising a sequence of delegations covering a delegation path from the access control device to the electronic key device such that, in the sequence of delegations, the delegator of the first delegation is the access control device, and the last delegation is the key delegation, wherein each delegation is a delegation from a delegator to a receiver.

vii. The electronic key device according to embodiment vi, wherein the key delegation is digitally signed by the delegator of the delegation.

viii. The electronic key device according to embodiment vi or vii, wherein the key delegation comprises a time constraint.

ix. The electronic key device according to any one of embodiments vi to viii, wherein the key delegation comprises an operation constraint.

x. The electronic key device according to any one of embodiments vi to ix, wherein in the step of receiving a response, the response is based on the server verifying the existence of a user account associated with the identity of the electronic key device.

xi. A computer program for controlling access to an access object, the computer program comprising computer program code which, when run on an electronic key device causes the electronic key device to:
  communicate with an access control device to obtain an identity of the access control device;
  send an access request to a server, the access request comprising an identity of the electronic key device and the identity of the access control device;
  receive a response from the server, the response comprising a key delegation to the electronic key device; and
  send a grant access request to the access control device, the grant access request comprising the key delegation, to allow the access control device to evaluate whether to grant access to the access object based on a plurality of delegations comprising a sequence of delegations covering a delegation path from the access control device to the electronic key device such that, in the sequence of delegations, the delegator of the first delegation is the access control device, and the last delegation is the key delegation, wherein each delegation is a delegation from a delegator to a receiver.

xii. A computer program product comprising a computer program according to embodiment xi and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for controlling access to an access object, wherein the access object is a lock for access to a physical space, the method being performed in an electronic key device and comprising the steps of:
  communicating with an access control device to obtain an identity of the access control device;
  sending an access request to a server, the access request comprising an identity of the electronic key device and the identity of the access control device;
  receiving a response from the server based on the server processing the access request, the response comprising a key delegation to the electronic key device; and
  sending a grant access request to the access control device, the grant access request comprising the key delegation, which configures the access control device to evaluate whether to grant access to the access object based on a plurality of delegations comprising a sequence of delegations from the access control device to the electronic key device such that, in the sequence of delegations, the delegator of a first delegation in the sequence of delegations is the access control device, and the last delegation is the key delegation, wherein each delegation is a data item that delegates an access right to the access object from a delegator to a receiver, wherein each delegation contains both a delegator identifier and a receiver identifier, and wherein the first delegation is implemented by assigning one or more owners in the configuration of the access control device.

2. The method according to claim 1, wherein each delegation is of a same data structure.

3. The method according to claim 1, wherein the key delegation is digitally signed by the delegator.

4. The method according to claim 1, wherein the key delegation comprises a time constraint.

5. The method according to claim 1, wherein the key delegation comprises an operation constraint.

6. The method according to claim 1, wherein in the step of receiving a response, the response is based on the server verifying the existence of a user account associated with the identity of the electronic key device.

7. An electronic key device for controlling access to an access object, wherein the access object is a lock for access to a physical space, the electronic key device comprising:
  a processor; and
  a memory storing instructions that, when executed by the processor, causes the electronic key device to:
  communicate with an access control device to obtain an identity of the access control device;
  send an access request to a server, the access request comprising an identity of the electronic key device and the identity of the access control device;
  receive a response from the server based on the server processing the access request, the response comprising a key delegation to the electronic key device; and
  send a grant access request to the access control device, the grant access request comprising the key delegation, which configures the access control device to evaluate whether to grant access to the access object based on a plurality of delegations comprising a sequence of delegations from the access control device to the electronic key device such that, in the sequence of delegations, the delegator of a first delegation in the sequence of delegations is the access control device, and the last delegation is the key delegation, wherein each delegation is a data item that delegates an access right to the access object from a delegator to a receiver, wherein each delegation contains both a delegator identifier and a receiver identifier, and wherein the first delegation is implemented by assigning one or more owners in the configuration of the access control device.

8. The electronic key device according to claim 7, wherein each delegation is of a same data structure.

9. The electronic key device according to claim 7, wherein the key delegation is digitally signed by the delegator.

10. The electronic key device according to claim 7, wherein the key delegation comprises a time constraint.

11. The electronic key device according to claim 7, wherein the key delegation comprises an operation constraint.

12. The electronic key device according to claim 7, wherein, the response is based on the server verifying the existence of a user account associated with the identity of the electronic key device.

13. A non-transitory computer program product comprising a computer program for controlling access to an access object, wherein the access object is a lock for access to a physical space, the computer program comprising computer program code which, when run on an electronic key device causes the electronic key device to:
  communicate with an access control device to obtain an identity of the access control device;

send an access request to a server, the access request comprising an identity of the electronic key device and the identity of the access control device;

receive a response from the server based on the server processing the access request, the response comprising a key delegation to the electronic key device; and send a grant access request to the access control device, the grant access request comprising the key delegation, which configures the access control device to evaluate whether to grant access to the access object based on a plurality of delegations comprising a sequence of delegations from the access control device to the electronic key device such that, in the sequence of delegations, the delegator of a first delegation in the sequence of delegations is the access control device, and the last delegation is the key delegation, wherein each delegation is a data item that delegates an access right to the access object from a delegator to a receiver, wherein each delegation contains both a delegator identifier and a receiver identifier, and wherein the first delegation is implemented by assigning one or more owners in the configuration of the access control device.

* * * * *